May 18, 1965 E. D. GIBSON 3,184,544

NOISE AND DISTORTION REDUCTION IN COMMUNICATION SYSTEMS

Filed Oct. 12, 1961 3 Sheets-Sheet 1

NOISE AND DISTORTION REDUCTION IN COMMUNICATION SYSTEMS

Filed Oct. 12, 1961

3 Sheets-Sheet 3

United States Patent Office 3,184,544
Patented May 18, 1965

3,184,544
NOISE AND DISTORTION REDUCTION IN COMMUNICATION SYSTEMS
Earl D. Gibson, Hyattsville, Md., assignor to ACF Industries, Incorporated, New York, N.Y., a corporation of New Jersey
Filed Oct. 12, 1961, Ser. No. 144,759
11 Claims. (Cl. 178—69)

This invention relates to the reduction of noise impulses and distortion in communication systems, thereby to increase the permissible rate of data transmission and reduce the number of errors.

Accurate distortion compensation is very important in high speed data transmission and inaccurate compensation frequently causes serious difficulties. Known delay equalizers, even if continuously adjustable, cannot provide the various shapes of differential delay versus frequency curves ordinarily encountered on wire lines. The error producing effects of impulse noise in data transmitting systems is evident.

The invention provides relatively simple equipment for very accurately correcting linear distortion and simultaneously reducing the susceptibility of data transmission systems to impulse noise. Although the invention is applicable to a wide variety of transmission systems, it will be described, for the sake of definiteness, particularly with reference to a digital data system having a transmitter and receiver connected by a wire line. At the transmitting station devices are provided which predistort the signals, for subsequently reducing the effects of impulse noise. At the receiving station similar devices correct both amplitude and delay distortion. These devices are easily adjustable continuously and are much more accurate, in general, than conventional equalizers. The amount of predistortion is adjusted for a given system to be much greater than the transmission circuit distortion, so that when the total distortion, including the predistortion and the transmission circuit distortion, is corrected at the receiver the impulse noise effects are greatly reduced. The predistorting device at the transmitter includes preferably an adjustable network for phase-frequency curve shaping followed by a device called an intersymbol interference corrector, or ISIC, and which is of the type disclosed in my previous applications Serial Nos. 133,936 and 133,966, both filed August 25, 1961. This device, in effect, derives a number of samples for each data bit, so that the correct amplitude of the received signal at any instant of time is dependent upon a large number of samples of the actual received signals taken over several milliseconds. By adjusting the predistorting circuit at the transmitter, almost any desired degree of dependency upon each sample can be selected. The receiver preferably includes a clipping circuit or limiter followed by a bandpass filter for eliminating non-signal frequencies, in addition to a phase curve shaping network and distorting circuit, similar to those at the transmitter, for simultaneously responding to the large number of transmitted samples for determining the correct signal amplitude for each instant of time. If a noise pulse changes a few of the sample amplitudes even by a large percentage, the likelihood of an error is far less with the circuits of the invention than without them.

An object of the invention is to reduce signal distortion and the effects of impulse noise in transmission or other systems, and particularly in high speed data transmission systems.

Another object of the invention is to provide accurate, continuously and easily adjustable apparatus for correcting both amplitude and delay distortion and reducing the effects of impulse noise.

Another object is to obtain simply and inexpensively, within wide limits, any desired amplitude-frequency and any phase-frequency transmission characteristic.

Still another object of the invention is to provide simple, adjustable, and inexpensive means for reducing the effects of impulse noise, without reduction of the useful data transmission rate.

The invention will be fully understood and other objects and advantages thereof will become apparent from the following description and the drawing wherein.

Figure 1:
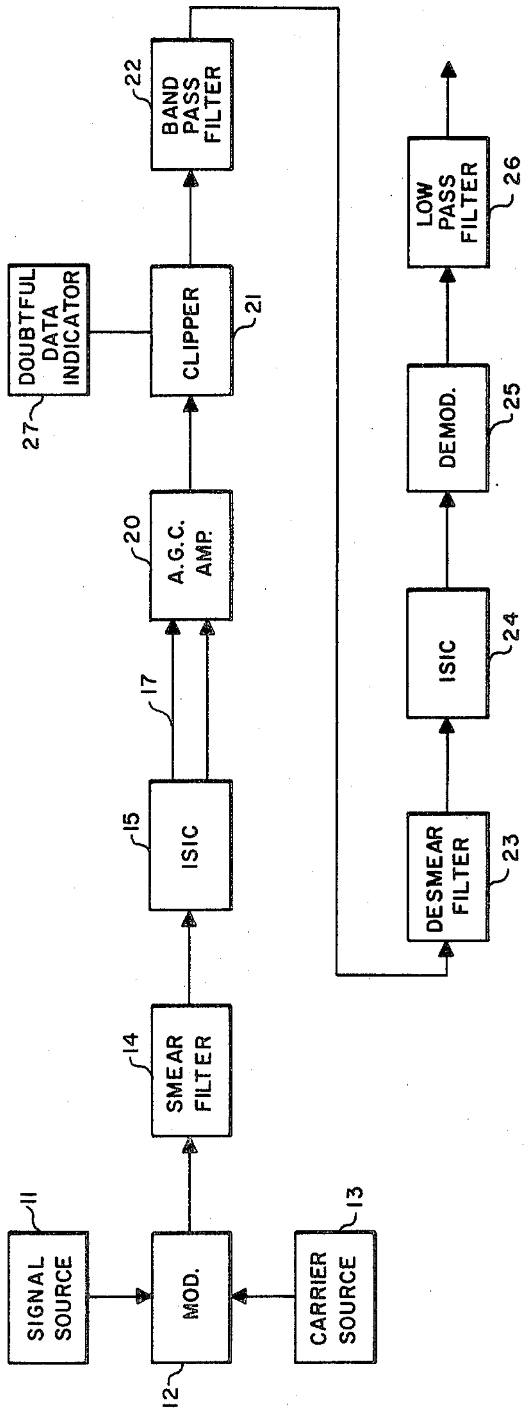
FIG. 1 is a block diagram of an embodiment of the invention.

Referring particularly to FIG. 1, signals of continuous or discrete form, such as binary data, are supplied by source 11 to modulator 12, on which carrier waves are impressed by carrier source 13. The signals in one form of the invention are binary data having a rate of 2400 or 4800 bits per second and carrier source 13 is synchronized with the data, and preferably has the same frequency. The output of modulator 12 is fed to a smear filter 14. This filter has a flat amplitude-frequency curve and a varying phase-frequency curve, and provides a delay of several milliseconds, which delay varies with frequency. For any particular system filter 14 can be fixed. In one embodiment of the invention filter 14 consisted of a series of 17 adjustable bridge circuits schematically shown in FIG. 3. The purpose of smear filter 14 is to spread each data bit over a number of bit intervals. The output of smear filter 14 is connected to a device 15 for simultaneously sampling or taking replicas of a number of successive bits, adjusting the values of the replicas and combining them to produce a predistorted output signal. Device 15, called an ISIC (Inter-Symbol Interference Corrector) is of the type disclosed in my previously mentioned applications S.N. 133,936 and S.N. 133,966. It will be described in connection with FIG. 2. Device 15 is connected to a transmission circuit such as a wire line 17 extending to a remote receiver station.

The receiver comprises an automatic gain controlled amplifier 20 followed by a clipper 21 or limiter which is adjusted to clip just above the signal level. Bandpass filter 22 is connected to the clipping circuit and designed to eliminate frequency components other than possible signal frequency components generated by the clipping. Desmear filter 23 has a long delay and is of the same type generally as smear filter 14 of the transmitter. Desmear filter 23 is followed by a device 24 of the same type as device 15 of the transmitter. Its output is fed to a suitable demodulator 25 and low pass filter 26. The output of clipper 21, since it varies with the quantity of noise impulses, can be supplied to a doubtful data indicator 27, for producing an indication or output signal in response to a predetermined level of noise likely to produce data errors. The output of filter 26 is supplied to suitable data recording or handling equipment, not shown. Other apparatuses not essential to an understanding of the invention are, for the sake of simplicity, omitted. Such apparatus might include vestigial sideband filters, amplifiers, carrier and data synchronizers, etc.

Figure 3:
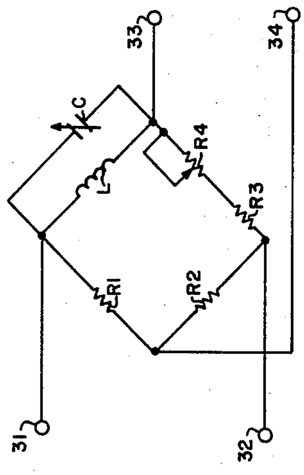
FIG. 3 is a schematic diagram of a bridge circuit.
Figure 4:
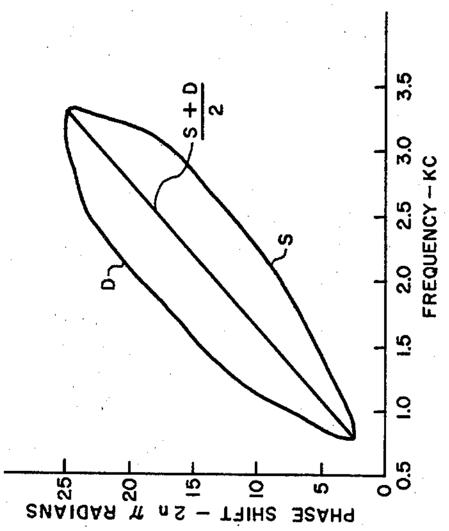
FIGS. 4–6 are graphs which are explanatory of the circuits shown in FIGS. 2 and 3.
Figure 5:
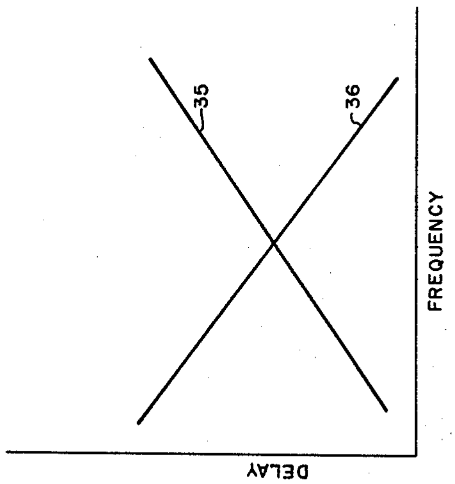

Smear and desmear (or phase curve shaping) filters 14 and 23, as previously mentioned, are formed of a series of bridge circuits, one of which is schematically shown in FIG. 3. This circuit has been shown and fully described in my application S.N. 133,966 for an Intersymbol Interference Corrector. The bridge comprises resistors $R_1$ to $R_4$, inductor L and capacitor C in parallel, a pair of input terminals 31, 32 and output terminals 33, 34. The shape of the phase-frequency curve of the bridge circuit is adjusted by varying $R_4$ and C. A detailed diagram of the bridge circuit is shown in FIG. 5 of the above-mentioned application and is specifically described therein. The filters formed by the bridge circuits have preferably a flat amplitude-frequency curve and a variable phase-frequency curve. Curves S and D in FIG. 4 show suitable phase-frequency curves for filters 14 and 23, respectively, employed for transmission over a particular telephone line. Curve $$\frac{S+D}{2}$$

shows the average phase shift of the two filter circuits. Curve S corresponds to a delay which increases directly with frequency and curve D represents a delay which varies inversely with frequency. Suitable idealized delay curves 35 and 36 of equal but opposite slopes for filters 14 and 23 are shown in FIG. 5. The filters need not be adjustable but may be fixed, and various types of filters can be used.

Figure 2:
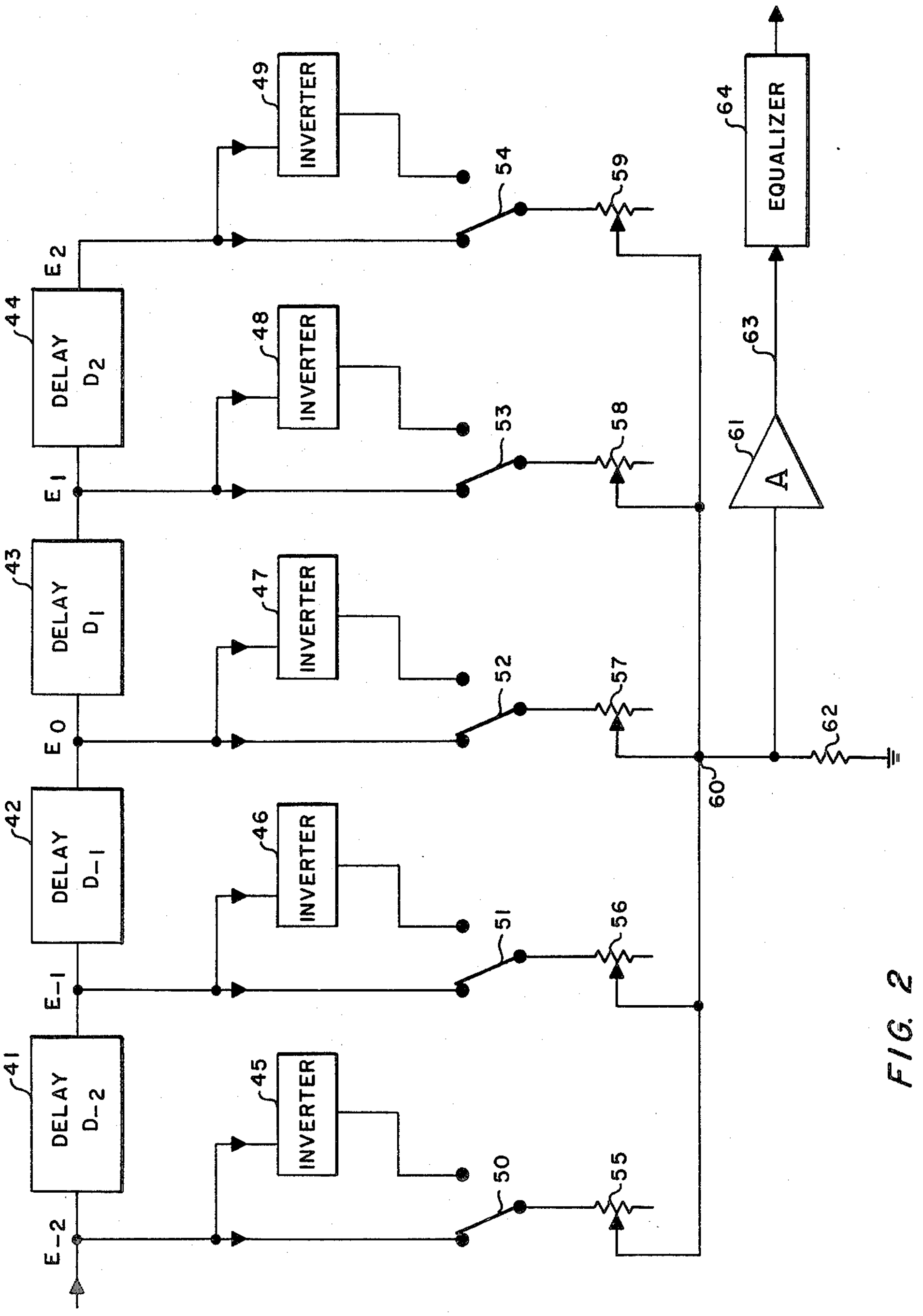
FIG. 2 is a diagram of an ISIC circuit for use in FIG. 1.

The ISIC (Intersymbol Interference Corrector) circuits 15 and 24 include one or more sections connected in series as shown in FIG. 4 of my application S.N. 133,-966. One section of the ISIC is shown in FIG. 2, which is substantially the same as FIG. 2 of the above mentioned application. The circuit includes a plurality of series connected delay circuits 41–44, preferably of the type shown in FIG. 3, although other types of delay circuits can be used. Circuits 41–44 store the signals for the duration of a number of data bit intervals and permit simultaneous sensing of a number of successive replicas. The outputs $E_{-2}$ to $E_2$ are fed through inverters 45–49, or directly, to selector switches 50–54. The inverters reverse the polarity of the outputs so that either polarity may be selected, as required by the transmission characteristics of the system. Switches 50–54 are connected to variable resistors 55–59, whose outputs are combined at junction point 60 and fed to a summing amplifier 61 having an input resistor 62 and an output 63. In a particular system the unused inverters may be omitted and fixed connections used in place of the switches. The output is connected to the input of the next section, which is substantially the same as that shown in FIG. 2, if more than one section is used. The ISIC may also be combined with a small fixed equalizer 64, which is provided with means enabling it to be switched into the system if required, particularly for straightening the ends of the phase-frequency curve somewhat, the remaining distortion being accurately corrected by an ISIC circuit having only one or two sections. This is made readily possible by the fact that equalization at the ends of the passband is far less important than it is near the carrier frequency. In some applications a sufficient reduction of distortion (an order of magnitude or more) can be obtained from an ISIC with only one or two stages and one or two adjustments.

In FIG. 1 impulse noise is reduced by three methods of attack, which are: (1) Spreading the noise pulses over so much time that all of these pulses except the catastrophic failures will be reduced to a small amplitude relative to the signal; i.e., making the predistortion large compared to the total line distortion, (2) Clipping the received voltage just above the maximum signal level so that high noise pulses are clipped off before spreading, and (3) Using an adjustable predistorter so that the predistortion can be set for a given application according to the type of noise pulses encountered most frequently in that application.

By using an adjustable ISIC at each end of the transmission line, the optimum results obtainable according to sampling theory can be very closely achieved in practice. The transmitter ISIC can be so adjusted that the correct amplitude of the received signal at any instant of time is dependent upon a large number of samples of the actual received signal taken over several milliseconds. Furthermore, almost any desired degree of dependency upon each sample can be selected. Then, the receiver ISIC can be set simultaneously to act on the large number of samples in determining the correct signal amplitude for each instant of time. Then, if a noise pulse changes the amplitudes of a few of the samples by a large percentage, the likelihood of such a noise pulse causing an error is far less with the properly adjusted ISIC's than without them.

Figure 6:
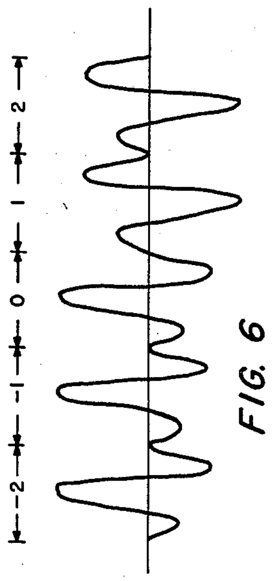

As an illustration, suppose we wish to spread any realistic noise pulse over a wide time interval and approximately minimize the peak amplitude of the resultant waveform without changing the total energy content of the pulse and without permitting the attenuation to vary by more than 20 to 1 as the frequency varies over the passband. FIG. 6 shows a compromise solution to this problem for a simplified noise pulse shape. The replicas are numbered in the same order as the outputs of the ISIC. The replica spacing, or delay per ISIC stage, in FIG. 6 is assumed to be equal to the noise pulse width. More even spreading could be achieved by not reversing the polarity of replicas 1 through $n$, but then, it can be demonstrated, some of the frequency components would have been very highly attenuated. One method of preventing such high attenuation is to reverse the polarity of the positively numbered replicas, other than the center one, as in FIG. 6.

Since in the example illustrated in FIG. 6 the pulse width has been increased by $2n+1$ to 1, the total energy of the pulse remains unchanged when the amplitude of each replica is $$\frac{1}{2n+1}$$

times that of the input pulse. By keeping the energy content of each pulse constant in both the predistorter 14, 15 and the distortion compensator 23, 24, both the signal amplitude at the over-all system output and the average power transmitted remain unchanged. Then, any reduction in amplitude of the noise pulses is achieved without changing the output signal amplitude.

If the width of the noise pulse is less than the replica spacing, the reduction in noise pulse amplitude achieved by using a given number of replicas (or ISIC stages) is the same as when the pulse width is equal to the replica spacing. For a pulse width greater than the replica spacing the reduction in amplitude is not as great. Therefore, for nearly maximum reduction in impulse noise amplitude from a given number of ISIC stages, the delay per stage should be at least as great as the widest noise impulse commonly encountered at the ISIC input. However, since long delays usually cost more than short ones, it is advisable to use a somewhat shorter delay per stage and more stages. For accurate distortion compensation, some stages with short delays (0.139 millisecond for example) are added to the receiver ISIC. These latter stages also increase the effectiveness against narrow noise pulses. As an alternative, the ISIC for distortion compensation can be kept entirely separate from another ISIC used against impulse noise.

Although the noise pulses that appear at the receiving end of wirelines are usually far from the simple shape shown in FIG. 6, the procedure outlined above can be extended to determine a feasible transmission-frequency characteristic that would be highly effective in reducing the amplitudes of noise pulses of various shapes.

For high effectiveness against impulse noise, the predistorter should have amplitude and/or phase curve bends considerably greater within the passband than those of the wirelines used. Then, enough distortion correction can be added at the receiver to correct for line variations without much reduction in the effectiveness against impulse noise. By making the receiver ISIC sufficiently adjustable, the over-all system distortion of the signal can be kept quite low.

A mathematical technique for determining the adjustments of the system can be defined, but it is more practical to make the adjustments experimentally. A given combination of digits is transmitted repetitively along with a typical noise impulse impressed on the transmitting end of the transmission line, and the stages of the ISIC circuits are then adjusted while observing the output of the system on an oscilloscope. As the proper adjustments are approached the oscilloscope pattern becomes less jumbled and clears up progressively. It has been found advantageous to determine the adjustments initially by using an artificial line simulating the real transmission line, so that the adjustments at the transmitting end can be made while readily observing the output of the system. The adjustments determined in this manner have been found to be highly effective in reducing the amplitudes of noise pulses of all shapes.

It will be evident that circuits other tahn those herein disclosed can be used to implement the invention. Thus an ISIC type circuit may be formed of a shift register, as disclosed in my application S.N. 133,936. Also it is possible to place ISIC 15 ahead of modulator 12 and ISIC 24 after the demodulator. Many other modifications may be made without departing from the spirit and scope of my invention, which is defined in the claims.

What is claimed is:

1. A communication system comprising a signal source, a first filter network connected to the output of said source having a delay which varies with frequency, means connected to said filter network for producing a plurality of time-spaced replicas of predetermined different relative amplitudes of the portion of the signal in each interval of a predetermined duration, means for superimposing each signal replica on the replicas of other signals in a plurality of adjacent intervals, means for transmitting the superimposed signal replicas, a receiving station connected to said transmitting means, said receiving station comprising a peak clipping circuit, a band pass filter connected to the output of the clipping circuit having a pass band encompassing the component frequencies of the signals, whereby said filter substantially eliminates frequency components outside the pass band, a second filter network connected to said band pass filter having a delay which varies with frequency inversely to that of said first filter network, and means for producing a plurality of replicas of predetermined different relative amplitudes of the received signal portions occurring in each predetermined time interval and for combining the replicas of different signal portions to reproduce the signals with a reduction of the distortion and noise superimposed by the transmitting means.

2. A communication system comprising a signal source, first phase shifting means connected to the output of said source having a delay which varies with frequency, first means connected to said phase shifting means for producing a plurality of time-spaced replicas of predetermined different relative amplitudes of the portion of the signal in each interval of a predetermined duration and for combining each signal replica with the signal replicas of other signals in a plurality of adjacent intervals, means for transmitting the combined signal replicas, a receiving station connected to said transmitting means, said receiving station comprising second phase shifting means connected to said transmission means having a delay which varies with frequency inversely to that of said first phase shifting means, and second means for producing a plurality of replicas of predetermined different relative amplitudes of the received signal portions occurring in predetermined time intervals and for combining the replicas of different signal portions to reproduce the signals with a reduction of the distortion and noise superimposed by the transmitting means.

3. A system according to claim 2, wherein said first and second means for obtaining a plurality of signal replicas and combining the same each includes a plurality of sections connected in cascade, each section including means for obtaining a plurality of replicas and combining the same.

4. A system according to claim 2, wherein said first and second means for obtaining and combining the signal replicas includes a plurality of delay devices connected in series and means for obtaining said signal replicas from said devices.

5. A system according to claim 4, including means for inverting the polarities of predetermined ones of said replicas.

6. Apparatus for reducing noise and distortion in a communication system comprising a source of discrete signals of a given duration, a first filter network connected to the output of said source having a delay which varies with frequency, means connected to said filter network for simultanously producing a plurality of replicas of adjacent signals, means for combining all simultaneously produced replicas, means for transmitting the combined signal replicas, a receiving station connected to said transmitting means, said receiving station comprising a peak clipping circuit, a band pass filter connected to the output of the clipping circuit having a pass band encompassing the component frequencies of the signals, whereby said filter substantially eliminates frequency components outside the pass band, a second filter network connected to said band pass filter having a delay which varies with frequency inversely to that of said first filter network, and means for simultaneously producing a plurality of replicas of adjacent portions of the received signals and combining the last mentioned replicas to reproduce the signals with a reduction of distortion and noise superimposed by the transmitting means.

7. A communication system comprising a source of carrier waves modulated by pulse signals, means connected to said source for producing a plurality of time-spaced replicas of each portion of a signal, means for combining each replica with the replicas of a plurality of adjacent signal portions, means for transmitting the combined signal replicas, a receiving station connected to said transmitting means, said receiving station comprising means for simultaneously producing a plurality of replicas of adjacent portions of the received signals and combining the last mentioned replicas to reproduce the signals with a reduction of distortion and noise superimposed by the system.

8. A communication system comprising a source of discrete signals each of a given duration, first circuit means connected to the output of said source having a delay which varies uniformly with frequency over a range of delays equal to several times the duration of a signal, means connected to said first circuit means for producing a plurality of samples of each signal, means for combining each signal sample with the samples of a plurality of adjacent signals, means for transmitting the combined signal samples, a receiving station connected to said transmitting means, said receiving station comprising second circuit means having a delay which varies with frequency inversely to that of said first circuit means, and means for simultaneously producing a plurality of samples of the received signals and compining the samples of different signals to reproduce the signals with a reduction of distortion and noise superimposed by the system.

9. A system according to claim 8, wherein said receiving station comprises a peak clipping circuit, a band pass filter connected to the output of the clipping circuit having a passband encompassing the component frequencies of the signals, whereby said filter substantially eliminates frequency components outside the passband.

10. A communication system comprising a source of binary data, a source of carrier waves in synchronism with the binary data, a modulator connected to said signal source and carrier wave source, signal spreading means connected to the output of said modulator having a delay which varies with frequency, sampling means connected to said signal spreading means for producing a plurality of replicas of each binary digit and adjusting the amplitudes and polarities of said replicas to different values, means for combining each replica with the replicas of a plurality of adjacent digits, means for transmitting the combined replicas, a receiving station connected to said transmitting means, said receiving station comprising a filter means having a delay which varies with frequency inversely to that of said signal spreading means, means for producing a plurality of simultaneous replicas of each received signal and means for variously adjusting the amplitudes and polarities of said simultaneous replicas and combining them to reproduce the signals with a reduction of the distortion and noise superimposed by the transmitting means.

11. A system according to claim 10, including equalizer means connected in series with said sampling means for equalizing said transmitting means near the ends of its passband.

References Cited by the Examiner

UNITED STATES PATENTS

| | | | |
|---|---|---|---|
| 2,531,642 | 11/50 | Potter | 179—100.2 |
| 2,865,997 | 12/58 | Gardburg | 178—69 |

FOREIGN PATENTS

| | | |
|---|---|---|
| 844/228 | 8/60 | Great Britain. |

ROBERT H. ROSE, *Primary Examiner.*